(12) United States Patent
Fujishima et al.

(10) Patent No.: US 6,626,294 B2
(45) Date of Patent: Sep. 30, 2003

(54) ROLL STAPLE

(75) Inventors: Atsuyoshi Fujishima, Tokyo (JP);
 Masayoshi Shigemitsu, Tokyo (JP);
 Yoshihiro Kaneko, Tokyo (JP);
 Masaru Ando, Tokyo (JP); Susumu Shinmei, Tokyo (JP)

(73) Assignee: Max Co., Ltd., Tokyo (JP)

( * ) Notice: Subject to any disclaimer, the term of this patent is extended or adjusted under 35 U.S.C. 154(b) by 7 days.

(21) Appl. No.: 09/915,675

(22) Filed: Jul. 26, 2001

(65) Prior Publication Data

US 2002/0014423 A1 Feb. 7, 2002

(30) Foreign Application Priority Data

Jul. 28, 2000 (JP) .......................................... 2000-228521

(51) Int. Cl.$^7$ ............................................... B65D 85/24
(52) U.S. Cl. ......................................... 206/340; 206/338
(58) Field of Search ................................. 206/338, 340, 206/341, 343, 345

(56) References Cited

U.S. PATENT DOCUMENTS

| | | | | |
|---|---|---|---|---|
| 2,085,783 A | * | 7/1937 | Borchert et al. | ............ 206/341 |
| 3,335,856 A | * | 8/1967 | Libby | ........................... 206/338 |
| 3,587,842 A | * | 6/1971 | Keck | ........................... 206/345 |
| 4,570,794 A | * | 2/1986 | Capitao, Jr. | .................. 206/394 |
| 6,086,304 A | * | 7/2000 | Hujishima et al. | .......... 206/340 |

FOREIGN PATENT DOCUMENTS

JP 61-27857 * 2/1986

* cited by examiner

Primary Examiner—David T. Fidei
(74) Attorney, Agent, or Firm—Chapman and Cutler LLP

(57) ABSTRACT

A roll staple (1) comprising a roll staple body (11) which is made of a sheet staple formed by a large number of straight staples (10a) jointed parallely, and wound in a roll state so as to make a through hole (1a) at the portion of central axis of the roll staple body, and a core material (13) which is fitted into the through hole (1a) formed in the roll staple body (11) by insertion.

7 Claims, 5 Drawing Sheets

ROLL STAPLE

BACKGROUND OF THE INVENTION

1. Field of the Invention

The present invention relates to a roll staple in which staples are jointed in side by side and wound in a roll shape.

2. Description of the Prior Art

As for the roll staple of this kind, that is shown, for example, in FIG. 6 and FIG. 7 is well known. This roll staple 1 comprises a roll staple body 11 and pulling out tape 12. The roll staple body 11 is composed of a belt like sheet staple which is made of straight staples 10a adhered together with their sides parallely adjoining, and the sheet staple is rolled in a coil shape so as to form a through hole 1a along a center axis of the roll in order to form the roll staple. Herein, the roll staple is formed so that a leading end 11a of the sheet staple is positioned in an outer surface of the roll and trailing end 11b of the sheet staple is positioned in an inner surface of the roll, that is to say, the inner surface of the a through hole 1a.

The pulling out tape 12 is attached removably on a portion near by the leading end 11a of roll staple body 11 by an adhesive material. The pulling out tape 12 is wound one round on the roll staple body 11 and a seizing portion 12a is mounted on its top end which is a free end of the tape 12.

The roll staple 1 which is composed as described above, is inserted and set in a staple cartridge (not shown) and then the pulling out tape 12 is pulled out from the staple cartridge, as a result only the roll staple body 11 is loaded on the staple cartridge. By pulling out of the pulling out tape 12, a state in which the leading end 11a of roll staple body 11 is set on a regulated position in the staple cartridge, is realized.

The staple cartridge is loaded on, for example, a motor operated stapler which is built in a copying machine. The motor operated stapler binds a pile of papers by means of a punching out of every staple 10a at leading end of sheet staple which is guided out from the roll staple body 11.

However, in the above described roll staple 1 of prior art, when a strong impact is applied against the roll staple body 11, for example because the roll staple is fallen onto a floor, there may be a case that the through hole 1a is deformed into oval shape as shown in FIG. 8. If the through hole 1a has been deformed as such, there may be case that portions near a trailing end 11b of the roll staple body 11 is broken, for example, by having a pressure in vertical direction in L shape or as irregularly overlapping. And if such kind of breakage is happened, there may be a case that the broken portion blocks, for example, a guide path of the above described staple cartridge, which guides the sheet of staples from roll staple body 11.

SUMMARY OF THE INVENTION

The purpose of the invention is to provide a roll staple in which happening of broken sheet staple at the trailing end portion of sheet staple of the roll staple body 11 located in the through hole.

The present invention has a feature that a roll staple characterized by comprising a roll staple body which is made of a sheet staple formed by a large number of straight staples jointed parallely, and wound so as to make a through hole at the portion of central axis, and a core material which is inserted into the through hole of the roll staple body.

DETAILED DESCRIPTION OF THE EMBODIMENT

Figure 1:
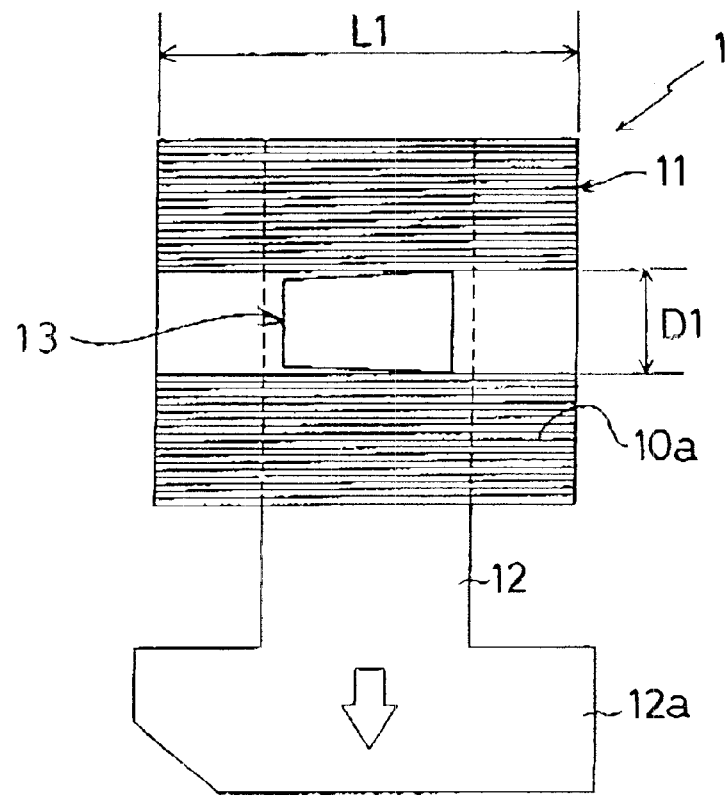
FIG. 1 is a cross sectional view showing a roll staple according to an embodiment of the present invention.

Hereinafter an embodiment of the roll staple according to the present invention will be described with reference to FIG. 1 to FIG. 5. The portions and members which are commonly utilized in prior art are designated with the same symbols and explanation for those parts will be omitted.

A roll staple 1 comprises a roll staple body 11, a pulling out tape 12 which is wound one round around the roll staple body 11 and a core material 13 which is attached into a through hole 1a of the roll staple body 11 by an insertion.

Figure 2:
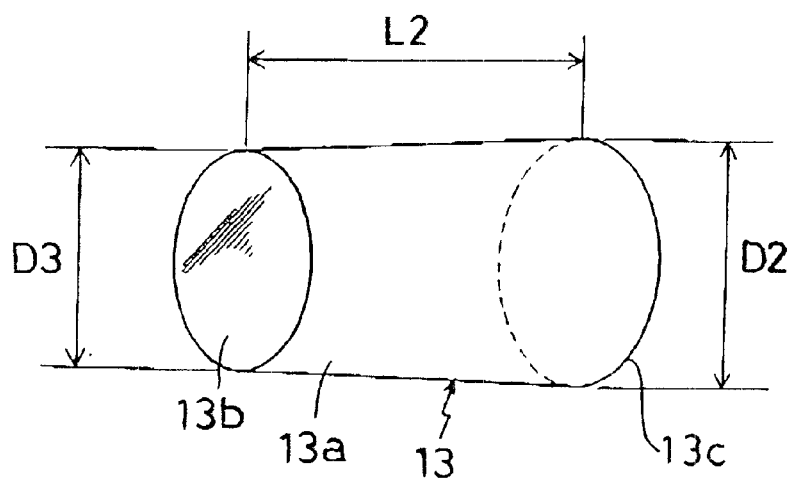
FIG. 2 is a perspective view showing a core material.
Figure 3:
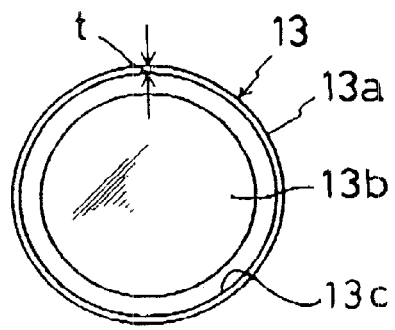
FIG. 3 is a plan view showing the core material of FIG. 2.

The core material 13 is made of, for example, polypropylene into which calcium carbonate is mixed with amount of, for example, 30 percent, and formed in a cup shape. This core material 13 is formed in a body with cylindrical sidewall 13a and a bottom wall 13b which closes one end of the cylindrical sidewall 13a. An opening hole 13c is made at another end of the sidewall 13a. The side wall 13a need not always be a tapered cylindrical shape as shown in FIG. 2, however, in this embodiment diameter of the core material 13 is getting smaller towards the bottom wall 13b. In accordance with this arrangement the diameter of outer surface of the side wall 13a becomes maximum outer diameter D2 at the opening end and becomes minimum outer diameter D3 at the end of the bottom wall 13b. And respective thickness t of the sidewall 13a and the bottom wall 13b are both designed to be about 0.5 mm. By this arrangement though a stiffness of the sidewall 13a is small against a force in the radial direction which causes the cross section of the core material to be oval, it gives a tendency to recover into original shape by an elastic force of itself.

Herein an inner diameter D1 of the through hole 1a is arranged to be larger than or equal to the maximum outer diameter D2 of the core material 13. That is to say D1 is larger than or equal to D2, the core material 13 can be inserted into the through hole 1a without fail. However, because the through hole 1a is formed so that the inner surface diameter of it gets gradually larger as a spiral, the inner diameter D1 in the above described relation means the minimum diameter of the through hole 1a.

Moreover, because the sidewall 13a is formed in a tapered cylinder shape, needlessly to say the outer diameter D3 of core material 13 is smaller than the outer diameter D2. That is to say D2 is larger than D3. Herein, the outer diameter D2 is preferably formed to be almost equal to the inner diameter D1 of the through hole 1a.

A length L2 along axial direction of the core material 13 is set shorter than or equal to a length L1 along axial direction of the roll staple body 11. That is to say, L1 is longer than or equal to L2, it is arranged in order the core material 13 not to protrude from the through hole 1a.

Figure 4:
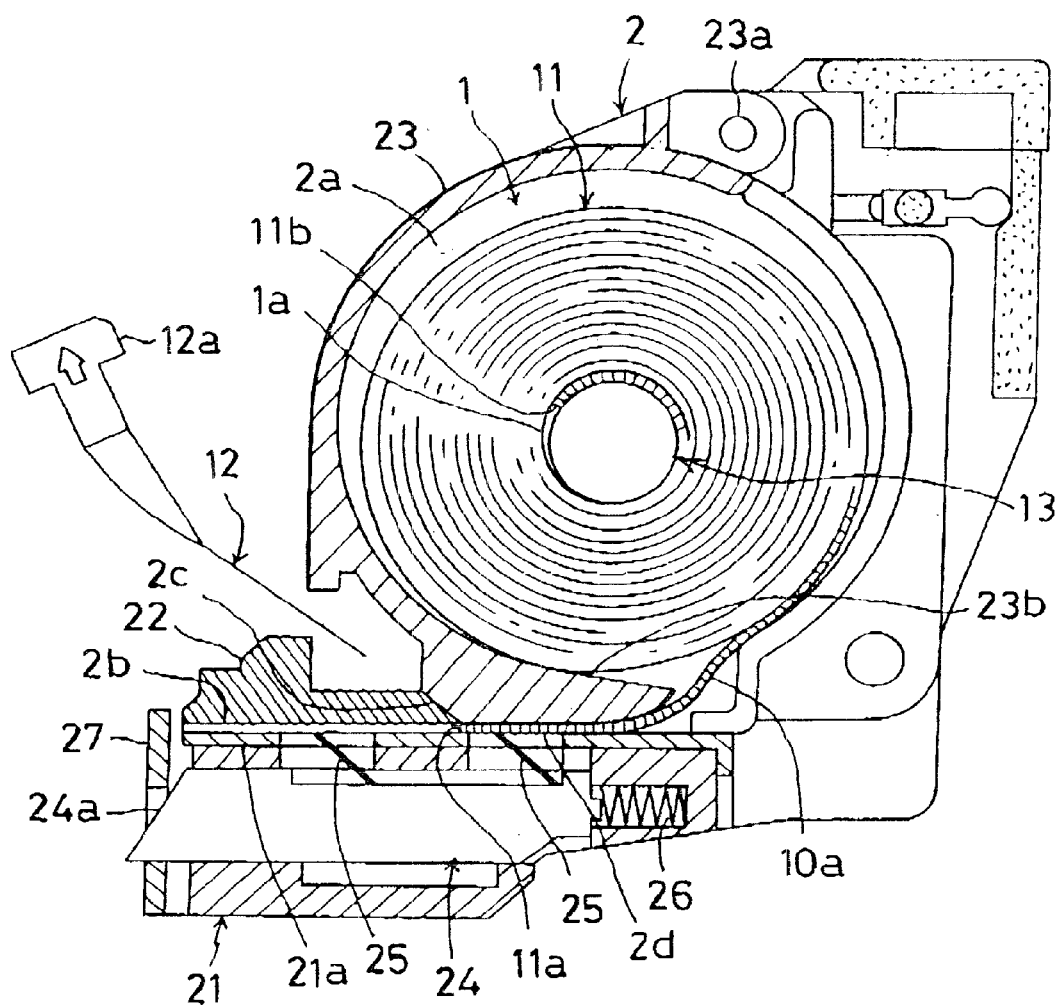
FIG. 4 is a cross sectional view showing a state that a roll staple is loaded in a staple cartridge.

FIG. 4 shows a staple cartridge 2 into which the roll staple body 11 is loaded. This staple cartridge 2 includes a loading room 2a which has a circular cross section and into which the roll staple body 11 is rotatably loaded. A front lid 23 which is capable of being opened and closed by a rotating hinge 23a provided in an upper portion, is provided with the staple cartridge 2, it is arranged in order that the roll staple body 11 is loaded in the loading room 2a through an opening of the front lid 23 with a rotation in the clock wise direction on FIG. 4.

A guide path 2b which guides the roll staple body 11 extended in sheet shape, is arranged in a lower portion of the staple cartridge 2. The guide path 2b is formed between a guide plate 21a which is arranged on the base member 21 and a guide member 22 which is arranged over the guide plate 21a. Further at the back of the guide path 2b there is formed a guide path 2d. This guide path 2d is formed between the guide plate 21a and the lower end portion 23b of the front lid 23. The guide path 2d can be opened at the upper side thereof by opening the front lid 23. A spacing 2c which has a space enough to pass the pulling out tape 12, is formed at a contacting portion between the guide member 22 and the lower end portion 23b of the front lid 23.

A cam plate 24 which can reciprocate along the front and back direction (left and right direction on the FIG. 4) on the base member 21 and a ratchet claw 25 to send only in the front direction the roll staple body 11 which pass through the guide path 2b on the cam plate 24. And the front end surface of the cam plate 24 becomes a slanted surface 24a which is slanted so as to be lower according to going forward. This cam plate 24 is urged to leftward on the drawing by a spring 26 which is arranged in the base member 21. In the front side of the base member 21, a front end plate 27 is arranged with a spacing in which the driver, which is not shown, passes with staple 10a. This front end plate 27 is arranged in order to be a guide plate through which the staple 10a is punched out by the driver, which is not shown, and at the same time to be a stopper by which a front position of the cam plate 24 is defined.

The driver of a motor driven stapler (not shown), for example, which is built in a copying machine, is arranged in order to reciprocate vertically in the space between the front end plate 27 and the base member 21. This driver of the motor driven stapler is made to cut out the staple 11a which is located in the leading end of the roll staple body 11 when the driver goes downward and punch the staple downward to bind a pile of papers. Herein the staple 11a which is located in the leading end of the roll staple, has been already formed in U shape by a forming plate (not shown) and this forming plate forms the staple which is located in the second leading end of the roll staple in U shape when it goes downward with the driver.

Because the above described driver can be seen as that reciprocates in a space between the front end plate 27 and the slanted surface 24a of the cam plate 24, the driver is made in order to reciprocate the cam plate 24 and to drive the roll staple body 11 frontward in a distance of the width of one staple 10a in every one punching out of the staple 10a.

In order to load the roll staple 1 which is composed as described above, into the staple cartridge 2, firstly the front lid 23 of the staple cartridge 2 is opened, then the roll staple 1 into which the core material 13 has already been put by inserting in the through hole 1a of the roll staple body 11. Finally the front lid 23 is closed.

Before the lid 23 is closed the leading end portion of the pulling out tape 12 has been made to be pulled out a little from the spacing 2c. And the pulling out tape 12 is pulled away from the loading room 2a by pulling of the seizing portion 12a. This causes a state that only the roll staple body 11 is remaining in the loading room 2a. And by the pulling out of pulling out tape 12 the leading end portion of the roll staple body 11 is extended in a sheet shape, and the staple 11a which is located in the front end of the sheet staple is brought to move through the guide path 2d to a predetermined position in the guide path 2b. By this operation a state in which the roll staple body 11 can be carried forward by the claw 25, is realized.

After all the staples of roll staple body 11 have been carried and exhausted, the core material 13 is still remaining in the loading room 2a. Since, it needs that a new roll staple body 11 is loaded into the loading room 2a after the core material 13 has been removed.

According to the roll staple 1 described above, when the roll staple 1 is fallen onto floor, for example, during the loading into the staple cartridge 2, if the impact is not so large, inner surface of the through hole 1a can be maintained in circular without any problem by the core material 13 because the core material 13 is inserted into the through hole 1a. Therefore, it can be prevented that breakage in L shape is caused to happen at the portions near a trailing end 11b of the roll staple body 11 at the through hole 1a.

When in a case that the impact of falling is large enough, the core material 13 is deformed elastically in oval shape in accordance with that the through hole 1a is deformed in oval shape because the one end of the core material 13 is opened. However, the occurrence of breakage of sheet can be prevented because the side wall 13a of the core material 13 makes a portion near the trailing end 11b of the roll staple body 11 to be brought into contact with the inner surface of the through hole 1a.

And a damage of staple 10a itself can be also prevented by the impact because the core material 13 is elastically deformed as described above and absorbs the impact of falling. The core material 13 can be surely prevent the breakage of sheet without breakage by the large impact because the one end of the core material is closed by the bottom wall 13b.

Herein the core material 13 can be easily inserted into the through hole 1a of the roll staple body 11 from the smaller diameter end of the core material 13 because the side walls of the core material is formed in the tapered cylindrical shape.

In the above described embodiment there has been shown a core material 13 whose thickness t of the side wall is designed as 0.5 mm, however, the thickness t may be able to be designed other than 0.5 mm. By designing this thickness t much thicker than 0.5 mm, a rigidity of the side wall 13a can be increased and the core material may be composed as that it can be maintained the through hole 1a circular even when it experiences the usual falling down.

Also in the above described embodiment, the side wall 13a of the core material 13 is designed in tapered cylinder, the side wall 13a may be formed in a regular straight cylinder in which the diameter is constant along the axis direction. Further the core material 13 may be formed by only the side wall 13a without the bottom wall 13b when it has much increased rigidity.

Figure 5:
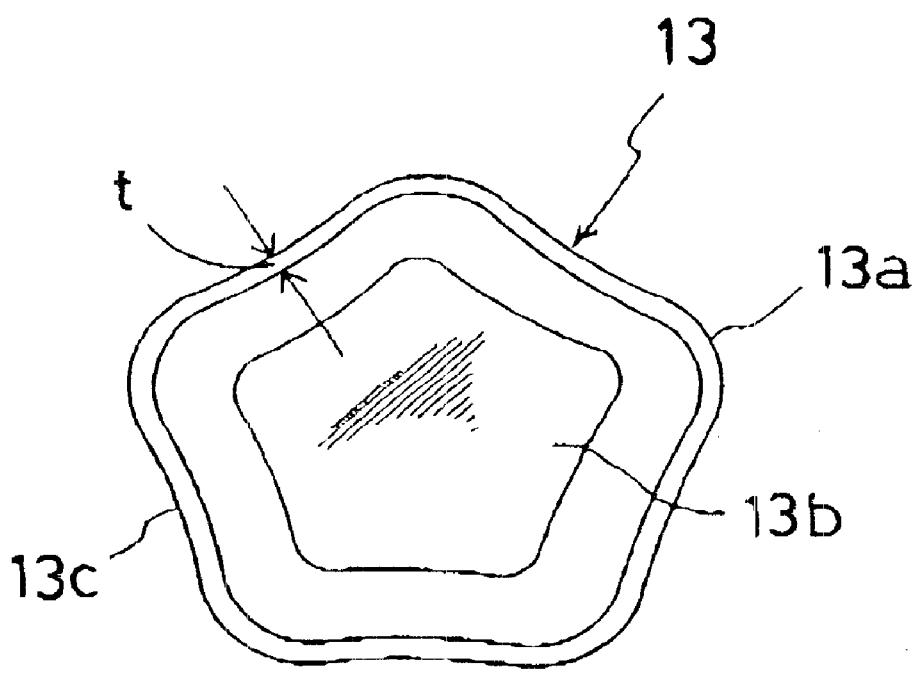
FIG. 5 is a plan view showing another example of the core material.
Figure 6:
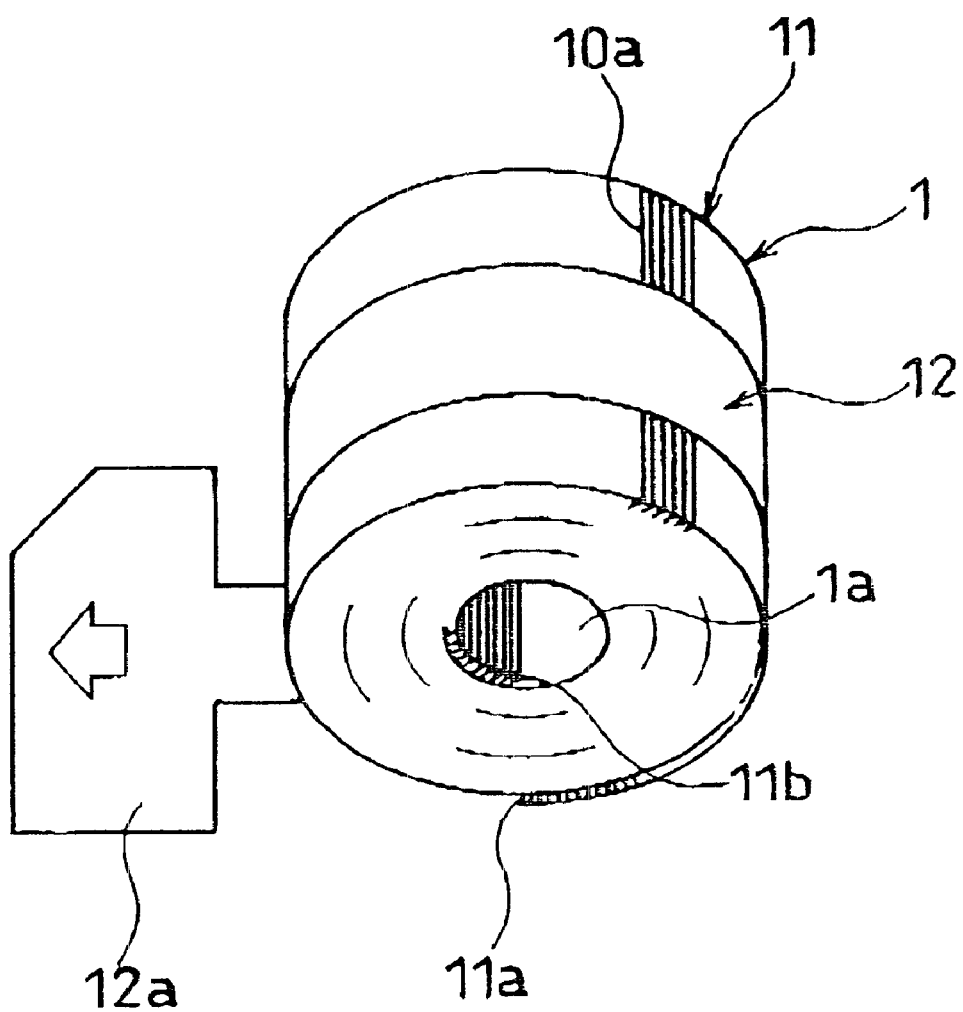
FIG. 6 is a rough sketch of perspective view showing a roll staple of prior art.
Figure 7:
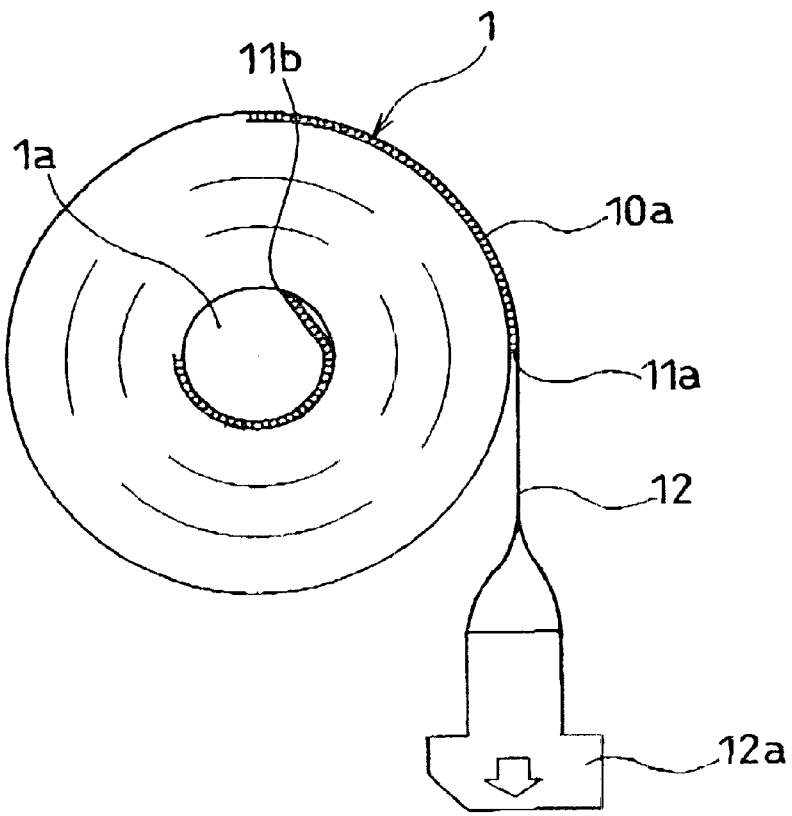
FIG. 7 is a front view of the roll staple shown in FIG. 6.
Figure 8:
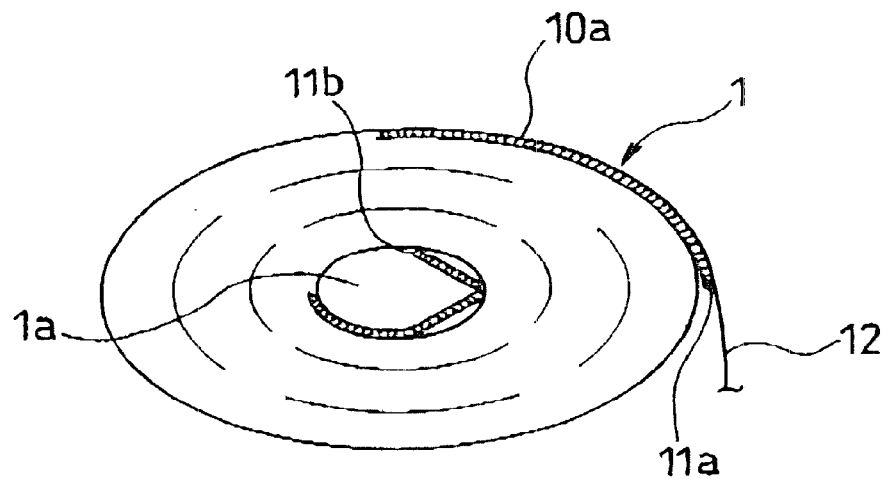
FIG. 8 is an explanatory view showing a problem of the roll staple in prior art.

Moreover, in the above described embodiment the core material 13 is formed having its cross section circular, however, it may be formed having deformed pentagonal cross section which has five concave portions 13c extending along the axial direction of the core material, as shown in FIG. 5. Respective concave portions 13c are formed concave by deforming partly five portions of the side wall 13a. The convex portions between the concave portions 13c are formed to be a part of circular so as to fit to the inner surface of the through hole 1a. By this arrangement of forming the concave portions 13c at the side wall 13a, the rigidity of side wall 13a can be increased. According to this fact, it shows an effect to prevent the through hole 1a deformed into oval shape.

Also the core material 13 can be easily inserted into the through hole 1a because the core material 13 is inserted into the through hole 1a so as for the concave portions 13c to avoid the portion near the trailing end 11b of the roll staple body 11. The convex portions which are adjoining to the concave portion 13c can hold the inner surface of the through hole 1a in well balanced state with periodical distance along the circumferential direction. In the above described embodiment there is designed the five concave portions, however, it is enough at least one concave portion.

Further in the above described embodiment though the core material 13 is made of side wall and bottom wall with empty body, it may be formed with straight or tapered cylindrical body without empty body. In this case the core material 13 may be made of styrene foam or wood which is wasted. By this arrangement of the cylindrical core material 13 without empty body, the rigidity of the core material 13 against the oval deformation direction becomes extremely large. And it can prevent the through hole 1a deformed in oval shape.

Also in the above described embodiment though the core material 13 is inserted into the loading room 2a with the roll staple body 11, however, it may be removed after the roll staple body 11 is loaded in the loading room 2a.

What is claimed is:

1. A roll staple comprising:

a roll staple body which is made of a sheet staple formed by a large number of straight staples jointed parallely, and is wound in a roll state so as to make a through hole formed at the portion of central axis of said roll staple body; and a core material which is fitted into said through hole formed in the roll staple body by insertion, wherein said core material is composed of side wall and bottom wall so as to have a closed end at one portion and opened end at other portion.

2. A roll staple comprising:

a roll staple body which is made of a sheet staple formed by a large number of straight staples jointed parallely, and is wound in a roll state so as to make a through hole formed at the portion of central axis of said roll staple body; and a core material which is fitted into said through hole formed in the roll staple body by insertion, wherein at least one concave portion which extends along an axial direction is formed at an outer surface of said core material.

3. A roll staple comprising:

a roll staple body which is made of a sheet staple formed by a large number of straight staples jointed parallely, and is wound in a roll state so as to make a through hole formed at the portion of central axis of said roll staple body; and a core material which is fitted into said through hole formed in the roll staple body by insertion, wherein said core material is composed of side wall and bottom wall so as to have a closed end at one portion and opened end at other portion, and wherein at least one concave portion which extends along an axial direction is formed at an outer surface of said core material.

4. A roll staple comprising a roll staple body which is made of a sheet staple formed by a large number of straight staples jointed parallely, and wound so as to make a through hole at the portion of central axis, and a core material which is inserted into said through hole of the roll staple body, wherein said core material is formed in tapered cylindrical shape.

5. A roll staple according to claim 4, wherein said core material is composed of side wall and bottom wall so as to have a closed end at smaller diameter portion and opened end at larger diameter portion.

6. A roll staple according to claim 4, wherein at least one concave portion which extends along an axial direction is formed at an outer surface of said core material.

7. A roll staple according to claim 4, wherein said core material is composed of side wall and bottom wall so as to have a closed end at smaller diameter portion and opened end at larger diameter portion, and wherein at least one concave portion which extends along an axial direction is formed at an outer surface of said core material.

* * * * *